US010516933B2

(12) United States Patent
Larsen et al.

(10) Patent No.: US 10,516,933 B2
(45) Date of Patent: Dec. 24, 2019

(54) HEADSET WITH OPTICAL MICROPHONE SIGNAL TRANSMISSION

(71) Applicant: GN Audio A/S, Ballerup (DK)

(72) Inventors: Leo Larsen, Ballerup (DK); Rene Elbæk Jensen, Ballerup (DK); Bent Dahlin Petterson, Ballerup (DK)

(73) Assignee: GM Audio A/S (DK)

( * ) Notice: Subject to any disclaimer, the term of this patent is extended or adjusted under 35 U.S.C. 154(b) by 0 days.

(21) Appl. No.: 15/991,630

(22) Filed: May 29, 2018

(65) Prior Publication Data
US 2018/0352317 A1 Dec. 6, 2018

(30) Foreign Application Priority Data

Jun. 1, 2017 (EP) .................................. 17174039

(51) Int. Cl.
H04R 1/10 (2006.01)
H04R 1/08 (2006.01)
H04M 1/05 (2006.01)

(52) U.S. Cl.
CPC .............. *H04R 1/105* (2013.01); *H04M 1/05* (2013.01); *H04R 1/08* (2013.01); *H04R 1/083* (2013.01);
(Continued)

(58) Field of Classification Search
CPC ........ H04R 1/105; H04R 1/08; H04R 1/1058; H04R 1/1066; H04R 1/1075; H04R 1/083;
(Continued)

(56) References Cited

U.S. PATENT DOCUMENTS 6,016,347 A * 1/2000 Magnasco ............ H04R 1/1041
379/430
6,463,092 B1 * 10/2002 Kim ........................ G09G 5/006
370/284

(Continued)

FOREIGN PATENT DOCUMENTS

EP 2178275 4/2010
JP 2001 197583 7/2001

OTHER PUBLICATIONS

Extended European Search Report for European patent application No. 17174039.2 dated Nov. 15, 2017.

Primary Examiner — Fan S Tsang
Assistant Examiner — Angelica M Mckinney
(74) Attorney, Agent, or Firm — Hamre, Schumann, Mueller & Larson, P.C.

(57) ABSTRACT

A headset for voice communication is provided comprising an earphone unit having a speaker, a microphone boom comprising one or more microphones wherein the microphone boom is rotatably interconnected with the earphone unit to allow for 360 degrees rotation. The microphone signals are transmitted from the microphone boom to the earphone unit via an optical transceiving unit having a transmitter and a receiver, wherein the microphone boom comprises the transmitter and the earphone unit comprises the receiver. The transmitter comprises a clock generator configured to generate a clock signal and a first processor configured to receive the microphone signals and to encode the clock signal into the microphone signals to form a first communication signal, and wherein the receiver comprises a clock re-generating unit for regenerating the clock signal, and a second processor for decoding the first communication signal according to the re-generated clock signal, and wherein the decoded microphone signals are provided to an electronic circuit in the earphone unit.

19 Claims, 10 Drawing Sheets

(52) U.S. Cl.
CPC ......... *H04R 1/1008* (2013.01); *H04R 1/1083* (2013.01); *H04R 1/1091* (2013.01); *H04R 2201/107* (2013.01); *H04R 2201/109* (2013.01)

(58) Field of Classification Search
CPC ............ H04R 5/0335; H04R 2201/107; H04R 2201/109; H04R 1/1091; H04M 1/05; H04M 1/6041; H04M 1/0335
See application file for complete search history.

(56) References Cited

U.S. PATENT DOCUMENTS

| | | | |
|---|---|---|---|
| 7,072,475 B1 * | 7/2006 | DeNap | H04B 1/385 |
| | | | 381/172 |
| 2002/0067825 A1 * | 6/2002 | Baranowski | H04M 1/05 |
| | | | 379/430 |
| 2004/0130358 A1 * | 7/2004 | Henry | H03K 23/667 |
| | | | 327/105 |
| 2007/0036484 A1 | 2/2007 | Hyatt | |
| 2007/0297459 A1 * | 12/2007 | Cucos | H04J 3/07 |
| | | | 370/505 |
| 2010/0022281 A1 * | 1/2010 | Cohen | H04B 1/385 |
| | | | 455/569.1 |
| 2013/0197920 A1 * | 8/2013 | Lesso | H04L 25/4902 |
| | | | 704/500 |
| 2018/0146306 A1 * | 5/2018 | Benattar | H04R 25/407 |

* cited by examiner

HEADSET WITH OPTICAL MICROPHONE SIGNAL TRANSMISSION

FIELD

The present invention relates to headsets for audio transmission, such as for voice communication, and in particular to headsets having a rotatable microphone boom.

BACKGROUND

It is well known to provide headsets for audio communication, the headsets typically having one or two earphones and a microphone, such as a microphone mounted on a boom or a mouthpiece. For headsets having two earphones, the earphones are typically connected via headbands, ear hooks, neckbands or other suitable means. To provide audio from one earphone housing to the other, an electrical connection connects the two earphones. The headsets may furthermore be wired or wireless, where the wireless headsets include a wireless communication hub, whereas the wired headsets connect signals from the headset to a telephone system and vice versa by wire. Typically, the wired connection is provided via a joint.

In order to protect the wires passing through the joint from damage due to twisting, arising from rotation to the joints, typically these joints are fixed joints, i.e. non-rotatable joints, making it cumbersome for a user to adjust the headset to a most favourable position, for example when switching from one ear to another. Furthermore, when putting the headset down and picking it up numerous times a day, the wires may get tangled. Alternatively, the joints may include a mechanical stop to restrict rotation. Such a mechanical stop then acts to limit the travel of the joint to less than a full revolution or to less than 360 degrees. However, failure of the mechanical stop is a common cause for malfunction of the headsets as such stops may simply break off. Furthermore, a joint having a mechanical stop makes it more cumbersome for a headset user to adjust the headset.

It is known in the art to provide a rotatable microphone boom, such as to allow a user to e.g. switch from one ear to another and move the microphone boom to the desired position. Such headsets may have a microphone boom with a mechanical stop to restrict the movement of the microphone boom. However also microphone booms without a mechanical stop are known in the art, such as for example disclosed in EP 2 178 275 B1 in which sliding contacts are used for electrical connections through a rotatable joint to allow for a fully rotatable pick up unit.

It is furthermore known in the art to transfer audio data using streaming via a digital data streaming interface, such as using an I2S/TDM solution, or via a digital audio connection such as using an S/PDIF interface.

SUMMARY

Despite the known solutions there is a need for an improved headset having a rotatable joint and allowing flexible transfer of audio data.

According to a first aspect, a headset for voice communication is provided, the headset comprising an earphone unit comprising a speaker, a microphone boom comprising one or more microphones, the microphone boom being rotatably interconnected with the earphone unit. The earphone unit comprises an electronic circuit configured to process microphone signals generated by the one or more microphones, the microphone signals being transmitted from the microphone boom to the earphone unit via a rotatable joint comprising an optical transceiving unit, the optical transceiving unit having a transmitter and a receiver. The microphone boom may comprise the transmitter and the earphone unit may comprise the receiver. The transmitter comprises a clock generator configured to generate a clock signal and a first processor configured to receive the microphone signals and to encode the clock signal into the microphone signals to form a first communication signal, and wherein the receiver comprises a clock re-generating unit, such as a phase locked loop (PLL), for regenerating the clock signal, and a second processor for decoding the first communication signal according to the re-generated clock signal, wherein the decoded microphone signals are provided to the electronic circuit.

According to another aspect, a method of, in a headset for voice communication having a microphone boom rotatably interconnected to an earphone unit, such as through a rotatable or pivotable joint, transmitting microphone signals from one or more microphones positioned at the microphone boom to an electronic circuit in the earphone unit is provided. The method comprises receiving by an optical transceiving unit, one or more microphone signals generated by the one or more microphones, transmitting the one or more microphone signals from the microphone boom to the earphone unit via the optical transceiving unit. The optical transceiving unit may have a transmitter arranged in or at the microphone boom and may have a receiver arranged in or at the earphone unit. The method comprises providing the one or more microphone signals to a transmitter of the optical transceiving unit, generating a clock signal in the transmitter, encoding the clock signal into the one or more microphone signal to form a first communication signal, optically transmitting the first communication signal to the receiver, re-generating the clock signal, decoding the first communication signal according to the re-generated clock signal to obtain decoded microphone signals, and providing the decoded microphone signals to the electronic circuit.

In a further aspect, a head-worn device is provided, the head-worn device comprising an ear-worn unit having a speaker, one or more microphones, and an optical communication through a rotatable joint comprising an optical transceiving unit, the optical transceiving unit having a transmitter and a receiver. The transmitter comprises a clock generator configured to generate a clock signal and a first processor configured to receive input signals from a first side of the rotatable joint and to encode the clock signal into the input signals from the first side of the rotatable joint to form a first signal, and wherein the receiver comprises a clock re-generating unit for regenerating the clock signal, and a second processor for decoding the first signal according to the re-generated clock signal, wherein the decoded signals from the first side are provided to an electronic circuit on a second side of the rotatable joint.

In a still further aspect an optical transceiver is provided, the optical transceiver being configured to provide an optical communication through a rotatable joint. The optical transceiving unit having a transmitter and a receiver. The transmitter comprises a clock generator configured to generate a clock signal and a first processor configured to receive input signals from a first side of the rotatable joint and to encode the clock signal into the input signals from the first side of the rotatable joint to form a first signal, and wherein the receiver comprises a clock re-generating unit for regenerating the clock signal, and a second processor for decoding the first signal according to the re-generated clock signal, wherein the decoded signals from the first side are provided to an electronic circuit on a second side of the rotatable joint.

The optical communication may be any optical communication formed through a rotatable joint, and may for example provide communication of information, such as of electrical signals, between the one or more microphones being rotatably interconnected with the ear-worn unit, it may be optical communication of electrical signal between e.g. the ear-worn unit, such as an electronic circuit in the ear-worn unit to a second speaker, and/or to a hard-wired line entering/exiting the head-worn device. The hard-wired line may connect to an external electronic circuit for processing signals from the head-worn device, such as from the ear-worn unit or the one or more microphones, to a base unit, such as a base unit for a voice communication system, such as to a telephone system, to an external speaker, to an external microphone, to a headset amplifier, a USB controller, to a processing unit having processing power, such as more processing power than the head-worn device and/or any combination of these.

It is an advantage of the embodiments disclosed in the present disclosure that a flexible rotatable connection is formed. The rotatable connection may be freely or indefinitely rotatable and may thus have 360 degrees rotation without any build-in stops. In that the microphone boom is freely rotatable the user may easily change from using a microphone boom at a right ear to use the microphone boom at the left ear. Typically, also in an office setting, the headset is picked up and put down numerous times a day, so that flexibility of any joints increase usability and reduces the risk of malfunction due to loose or broken connections through the joints.

It is a further advantage of at least some of the embodiments disclosed herein that the microphone signals may be transmitted with low latency while being less susceptible to interference. Also, the size of the interconnection may be optimized or reduced by using an optical transceiver compared to other mechanical solutions allowing free rotation. It is a still further advantage of the embodiments disclosed herein that clock and frame synchronization may be eliminated. It is a further advantage of at least some of the embodiments that the transfer of microphone data is isolated and thus less susceptible to interference.

In general, a headset is configured to be worn at least partly at or on the wearer's head, typically comprises one or two earphones and is capable of providing one or more audible acoustic output signals to at least one of the wearer's ears. A headset device may thus be monaural or binaural.

The earphone or the earphone unit may be any earphone, and may e.g. be configured to be worn over the ear (circumaurally), i.e. such that it covers the pinna completely, on the ear (supra-aurally), i.e. such that it covers a portion of the pinna, or in the ear, i.e. such that a portion of the earphone protrudes towards or into the ear canal or the earphone may be configured in other known ways, including combinations of and compromises between two or more of the above mentioned configurations.

The headset may comprise one or more microphones arranged to receive the wearer's voice and/or audio from the surroundings of a wearer. The microphones may be provided at any microphone supporting unit, such as at a microphone boom. The microphone boom may be any part of the headset rotatably interconnected the earphone, in some embodiments the microphone boom is an earpiece comprising the one or more microphones, and the microphone boom or earpiece may be provided at the ear of the user. The microphone boom may have an extension corresponding to the earphone unit, the microphone boom may extend beyond the size of the earphone, typically in the direction of a user's mouth and the microphone may in some embodiments extend to be near a wearer's or user's mouth when the headset is worn in the operational position at the ear of a user. In some embodiments, the microphone boom may have a part corresponding to an earphone unit part, this part being configured to be rotatably interconnected with the earphone unit.

The one or more microphones may generate digital microphone signals. The one or more microphones may be analogue microphones and an AD converter may be provided to provide microphone signals to the processor in a digital form. Alternatively, the one or more microphones may be digital microphones providing digital microphone signals.

The earphone unit comprises an electronic circuit configured to process microphone signals generated by the one or more microphones, the microphone signals being transmitted from the microphone boom to the earphone unit via the rotatable joint comprising an optical transceiving unit, the optical transceiving unit having a transmitter and a receiver.

The transmitter may comprise an electro-optical transmitter and the receiver may comprise an electro-optical receiver. Thus, the electro-optical transmitter is provided at one side of the rotatable joint and the electro-optical receiver is provided at another side of the rotatable joint. In some embodiments, the joint is rotatable about a rotational axis, typically such as about a centre axis of the joint.

The optical transmitter and the optical receiver may be arranged co-axially about the rotational axis for the joint, such as about a rotational axis for the microphone boom and the earphone unit being rotatable or pivotable connected. In this way, the optical signal may be coupled directly from the electro-optical transmitter to the electro-optical receiver, thereby in some embodiments reducing coupling loss. In other embodiments, an optical fibre may connect the electro-optical transmitter and the electro-optical receiver.

In some embodiments, the microphone boom comprises the transmitter, such as the electro-optical transmitter and the earphone unit comprises the receiver, such as the electro-optical receiver.

The optical transceiver, such as including the electro-optical transmitter and the electro-optical receiver, may be configured for any optical wavelengths, and may be configured for transceiving electromagnetic radiation in the optical wavelength range, including ultraviolet, visible and infrared wavelength range, such as electromagnetic radiation from 10 nm to 1 mm, and including one or more of the ranges 10 nm to 400 nm, 400 nm to 750 nm, 750 to 1400 nm, 1400 nm to 3 µm, 3 µm to 1 mm and any combination of these ranges.

The optical transmitter may be any conventional optical transmitter configured to receive an electrical signal and output an optical signal, and thus converting the electrical signal into an optical form for transmission. The optical transmitter thus comprises a light source, such as a light emitting diode, such as a laser diode or any other component as used in the art.

Likewise, the optical receiver may be any conventional optical receiver configured to receive an optical signal and output an electrical signal, and thus converting the received optical signal into an electrical signal. The optical receiver thus comprises any conventional optical receiver, such as a photo diode, a photo transistor, or any other component as used in the art. The receiver may be optimized to receive the signal provided from the transmitter.

Typically, the clock generator, such as a clock generating unit, comprises an oscillator, typically a crystal oscillator, such as a quartz crystal piezo-electric oscillator.

The clock generator may furthermore comprise frequency multiplication and/or divider circuits. The clock generator may comprise a phase locked loop. Likewise, the clock re-generator for regenerating the embedded clock signal may comprise a phase locked loop.

The first processor receives the input signals comprising the microphone signals and the clock signal. The processor encodes the clock signal into the microphone signals to form a first communication signal. The first communication signal is via the optical transceiver provided to the receiver. The receiver comprises a clock re-generating unit, such as a phase locked loop, for regenerating the clock signal, and a second processor. The second processor is configured for decoding the first communication signal according to the re-generated clock signal. The decoded communication signal comprising microphone signals is provided to the electronic circuit. The electronic circuit may further process the microphone signals for filtering, noise reduction, etc. before the microphone signals are distributed from the headset, i.e. either to a phone system, e.g. to a receiver side of a phone conversation, to a further processing unit, such as a further headset processing unit, such as a cloud or internet processing unit, e.g. for performing speech recognition, active noise cancellation, etc. The microphone signals may also be provided to the speaker as a side tone.

It should be envisaged that the clock generator may be provided as a part of the processor, or alternatively, the clock generator may be provided separately from the processor, in some examples, a part of the clock generator, such as the crystal, may be provided off-chip and thus separate from the processor, while any further part of the clock generator may be provided on-chip as part of the processor.

In some embodiments, the first processor receives the microphone signals and the clock signal, and the same clock signal is encoded into the microphone signals generated by the one or more microphones to form the first communication signal. Hereby, data for transmission between the transmitter and the receiver, i.e. the amount of data to be transmitted, may be minimized.

The processor receives the one or more microphone signals and the signals are sampled during each frame at a clock frequency, such as at a base clock frequency.

In some embodiments, the first processor has a number of input channels, each input channel being configured to receive input signals; in some examples, each input channel is configured to receive a first input during a first half cycle of the clock signal and a second input during a second half cycle of the clock signal, respectively. Typically the input channels are sampled at the base clock frequency.

The duration of an input may have a length being a half cycle of the clock frequency, such as a length of a half cycle of the base clock frequency.

In some embodiments, the first input channel of the number of input channels is configured to receive a first input being a dummy data signal and a second input being a microphone signal. The duration of the dummy data signal may be corresponding to the duration of the microphone signal. The dummy data signal may be a non-data signal for forming part of a header, such as a header providing start of frame information, such as a start of frame delimiter.

In some embodiments, the first input of the first input channel provides start of frame information for each frame of the first communication signal. The dummy data signal may be provided by the processor, so that e.g. the processor applies start of frame information for the duration of the first input signal.

Each further input channel is in some embodiments configured to receive a first input being a microphone signal, and a second input being a microphone signal, thus each further input channel may be configured to receive two microphone signals. The same clock signal may be encoded into the microphone signals provided by each further input channel.

In some embodiments, data from the one or more microphones are sampled during each frame, and data from the first input of the first input channel provides start of frame information for each frame.

In some embodiments, each further input channel is configured to receive a first input and a second input, the first and second input being any digital signals including any one or more of: a microphone signal, a digital data signal, a contact on-off signal, etc. The digital data signal may be any data signal providing information from the microphone boom to the earphone unit, and may be a mute signal, an on-off signal, a phone pick-up signal, etc. Likewise, the contact on-off signal may be any on-off signal, such as a mute signal, etc.

The clock signal is encoded into input signals, comprising microphone signals and/or data signals provided through the input channels, i.e. through the number of input channels, to provide a digital stream forming the first communication signal.

In some embodiments, the digital stream comprises in each frame: start of frame information, microphone information from each of the one or more microphones, such as from one microphone, such as from two microphones, such as in a preferable embodiment from three microphones, such as from four microphones, such as from five microphones, etc. Possibly, the digital stream comprises also information corresponding to a digital data signal.

The digital stream forming the first communication signal may be distinguished by clock duty cycle. The clock signal may be delimiting frame and input signals in the digital stream forming the first communication signal. The clock signal may be separating the bits of the digital stream, each bit comprising information about an input signal or start of frame.

The digital stream forming the first communication signal may have a state change at bit boundary assisting in clock re-generation. The state change may be a positive edge of the signal, or the state change may be a negative edge. The state change at bit boundary may be either a negative edge or a positive edge.

The clock signal may be re-generated from the state changes of the first communication signal. The clock may be re-generated from the data stream forming the first communication signal using a state change at regular time intervals of the first communication signal.

In some embodiments the headset further comprises an electrical connection comprising a first sliding contact, which comprises an earphone unit side and a microphone side, and wherein one of the earphone unit side or the microphone side of the sliding contact comprises a first annular ring arranged so that the ring is positioned around the rotational axis; the other of the earphone unit side or the microphone side comprises a number of contact members arranged in a radial distance from a rotational axis so as to provide an electrical connection between the first annular ring and the contact members.

The electrical connection is in some embodiments a DC power connection.

It is envisaged that the disclosed features and embodiments may be used in combination and with any aspect of the invention. The above and other features and advantages of the present invention will become more apparent to those of ordinary skill in the art by describing in detail exemplary embodiments thereof with reference to the attached drawings.

BRIEF DESCRIPTION OF THE DRAWING

The above and other features and advantages of the present invention will become readily apparent to those skilled in the art by the following detailed description of exemplary embodiments thereof with reference to the attached drawings, in which.

DETAILED DESCRIPTION

Figure 1:
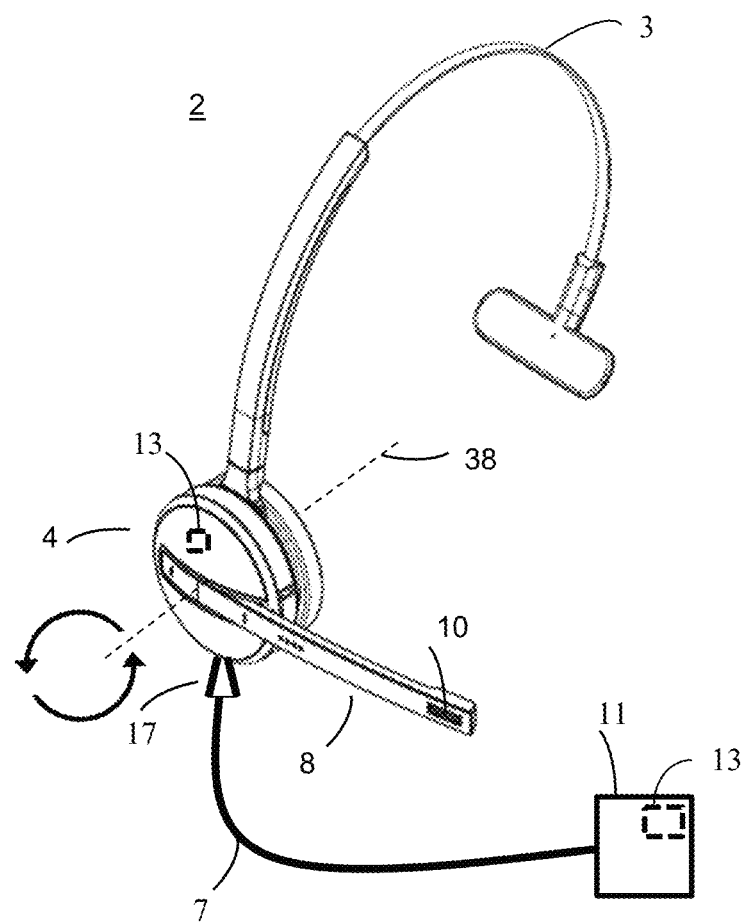
FIG. 1 illustrates an exemplary headset for voice communication.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 shows a headset 2 having one earphone or earphone unit 4 and a microphone boom 8 having one or more microphones 10. The headset is a monaural headset. The one or more microphones 10 are positioned at the microphone boom 8. The microphone boom is illustrated as having a length allowing for the microphone 10 to be positioned in proximity to a user's mouth, not illustrated. It should however be envisaged that any length of microphone boom may be used, such as a microphone boom having a length being the size of the earphone unit, such as a microphone boom having a length twice the size of the earphone unit, etc. The headset has a headband 3 for keeping the earphone unit 4 in position adjacent a user's ear, when worn by a user, however, any wearing style for the headset may be used, including ear hooks, neckbands, ear clips, etc. As illustrated, the microphone boom 8 is fully rotatable with respect to the earphone unit 4, around the rotational axis 38. Thus, the microphone boom may be rotated any multiple of 360 degrees with respect to the earphone housing without experiencing any mechanical stops.

The headset 2 illustrated is a wired headset having a wire 7 connecting the headset 2 to the headset base station 11. Alternatively, the headset may be a wireless headset 2 and the earphone unit 4 and the base station 11 may both comprise a wireless transceiver 13 (dashed). The wire 7 is connected to the earphone unit via joint 17. The joint 17 may be a rotatable joint, and in some embodiments, the communication from the earphone unit 4 to the base station 11 may be implemented using an optical transceiver, such as an optical transmitter being positioned in the earphone unit, providing the optical signal to the base station 11 via an optical fibre for connecting to an optical receiver in the base station 11.

Figure 2:
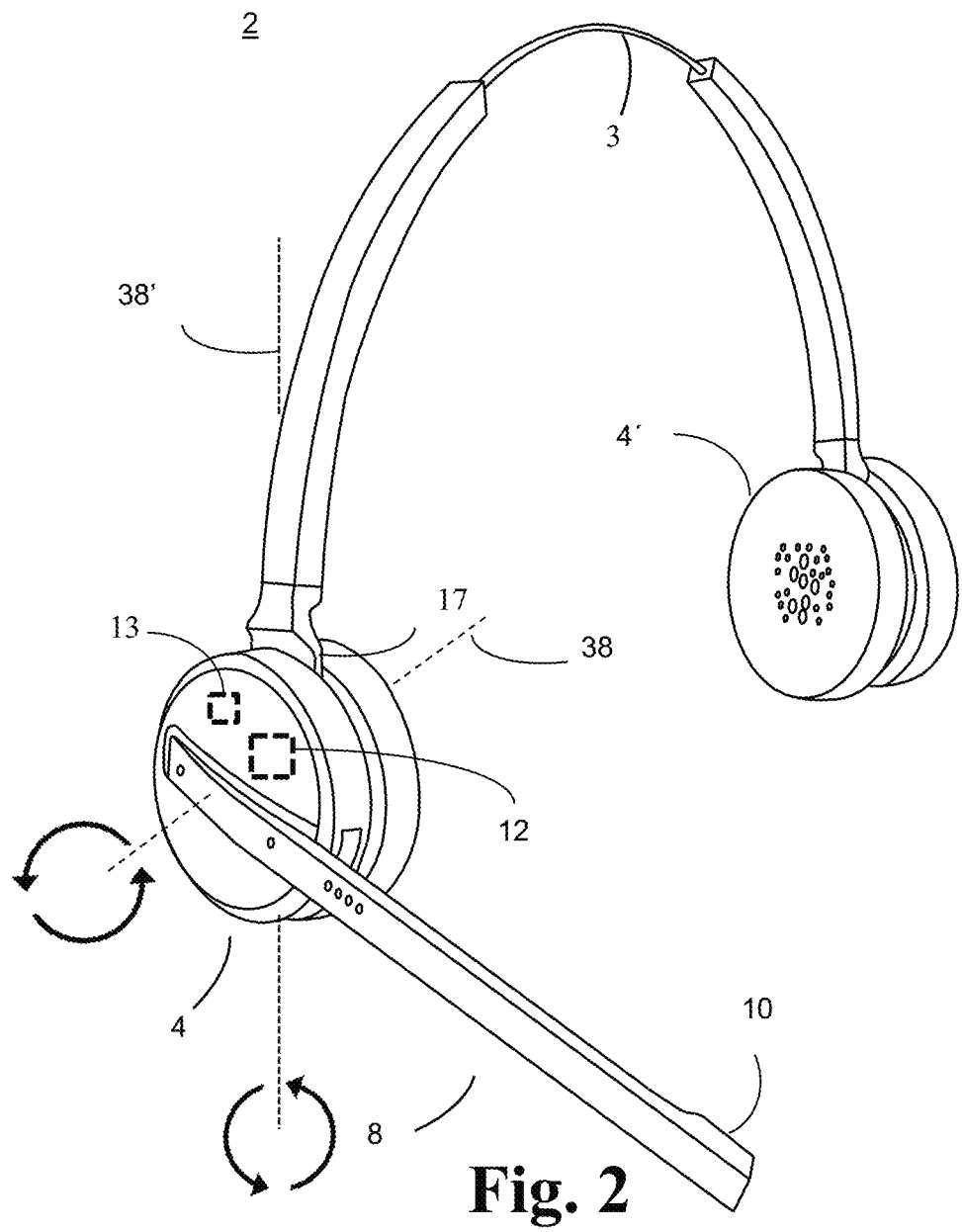
FIG. 2 illustrates an exemplary headset for voice communication.

The headset 2 as shown in FIG. 2 has a first earphone unit 4, a second earphone unit 4' and a microphone boom 8 having one or more microphones 10. The headset is a stereo or binaural headset. The earphone u nit 4, 4' further comprises an electronic circuit 12 for processing incoming microphone signals and provide the processed microphone signals to e.g. a receiving side of a telephone conversation, a computer, a processing unit, etc. requiring input (not shown). The one or more microphones 10 are positioned at the microphone boom 8. The microphone boom is illustrated as having a length allowing for the microphone 10 to be positioned in proximity to a user's mouth, not illustrated. It should however be envisaged that any length of microphone boom may be used, such as a microphone boom having a length being the size of the earphone unit, such as a microphone boom having a length twice the size of the earphone unit, etc. The headset has a headband 3 for keeping the earphone unit 4 in position adjacent a user's ear, when worn by a user, however, any wearing style for the headset may be used, including ear hooks, neckbands, ear clips, etc. As illustrated, the microphone boom 8 is fully rotatable with respect to the earphone unit 4, around the rotational axis 38. Thus, the microphone boom may be rotated any multiple of 360 degrees with respect to the earphone unit without experiencing any mechanical stops.

Alternatively or additionally, the first earphone unit 4 may be fully rotatable about the axis 38' so that the earphone unit is rotatable about the rotatable joint 17 connecting the earphone unit 4 to the headband 3. The joint 17 may thus be a rotatable joint, and in some embodiments, the electrical connection from the first earphone unit 4 to the second earphone unit 4' may be implemented using an optical transceiver, such as an optical transmitter being positioned in the first earphone unit 4, providing the optical signal to the second earphone unit via an optical fibre for connecting to an optical receiver in the second earphone unit. It should be envisaged that the optical receiver also may be provided in the headband.

Figure 3:
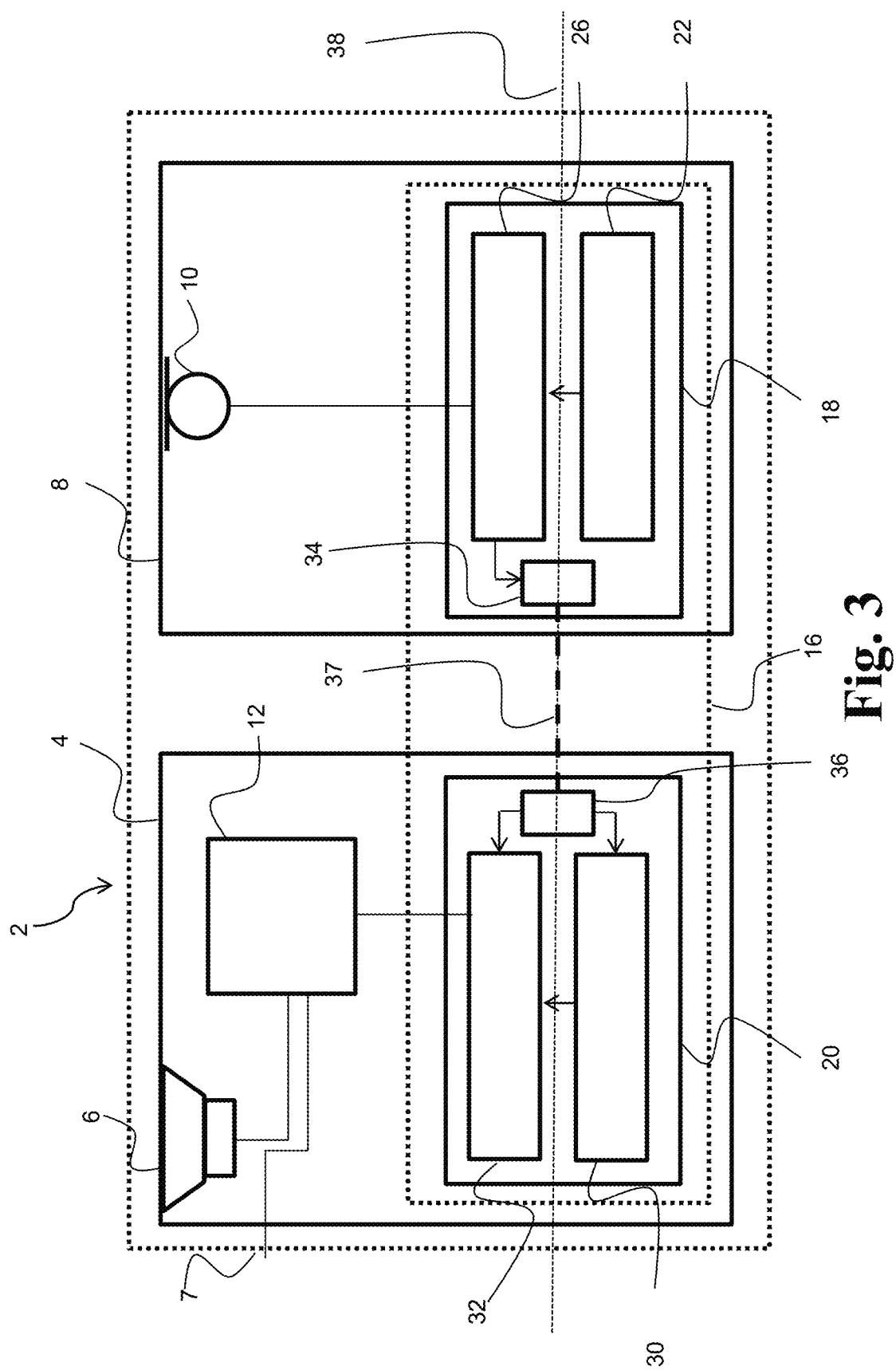
FIG. 3 schematically illustrates an exemplary headset for voice communication.

FIG. 3 schematically illustrates an exemplary headset 2 for voice communication. The headset 2 comprises an earphone unit 4. The earphone unit 4 comprises a speaker 6 for providing audio signals to a wearer of the headset. The headset 2 comprises a microphone supporting unit, such as microphone boom 8. The microphone boom 8 comprises at least one microphone 10 for reception of audio signals. Alternatively, the microphone boom 8 comprises more than one microphone, such as two microphones or such as three microphones, such as four microphones or such as five microphones. The microphone boom 8 is rotatably interconnected with the earphone unit 4.

The earphone unit 4 comprises an electronic circuit 12, such as an audio integrated circuit. The electronic circuit 12 is configured to process microphone signals generated by the microphone 10 and provide an output signal 7. The microphone signals are transmitted from the microphone boom 8 to the electronic circuit 12 in the earphone unit 4 via an optical transceiving unit 16. The optical transceiving unit 16 comprises a transmitter 18 and a receiver 20. The microphone boom 8 comprises the transmitter 18 and the earphone unit 4 comprises the receiver 20. The transmitter 18 comprises an electro-optical transmitter 34 and the receiver 20 comprises an electro-optical receiver 36 and an optical signal 37 is transmitted from the electro-optical transmitter to the electro-optical receiver. The electro-optical transmitter 34 and the electro-optical receiver 36 are arranged co-axially about a rotational axis 38 for the microphone boom 8 and the earphone unit 4, the rotational axis 38 being illustrated schematically. It should be envisaged that an off-axis arrangement of the electro-optical receiver and the electro-optical transmitter may also be contemplated and any known means, including optical fibres, mirror arrangements etc., may be used to couple the optical signal 37 generated by the electro-optical transmitter 34 to the electro-optical receiver 36. The transmitter 18 further comprises a clock generator 22 configured to generate a clock signal, and a first processor 26. The first processor is configured to receive the microphone signals and the clock signal and encode the clock signal into the microphone signals to form a first communication signal. The receiver 20 further comprises a clock re-generating unit 30 for regenerating the embedded clock signal. The receiver 20 comprises a second processor 32 configured to receive the first communication signal and the re-generated clock signal and to decode the first communication signal according to the re-generated clock signal. The decoded first communication signal, corresponding to the decoded microphone signals, is provided to the electronic circuit 12. In some embodiments, the clock signal is embedded within the first communication signal.

Figure 4:
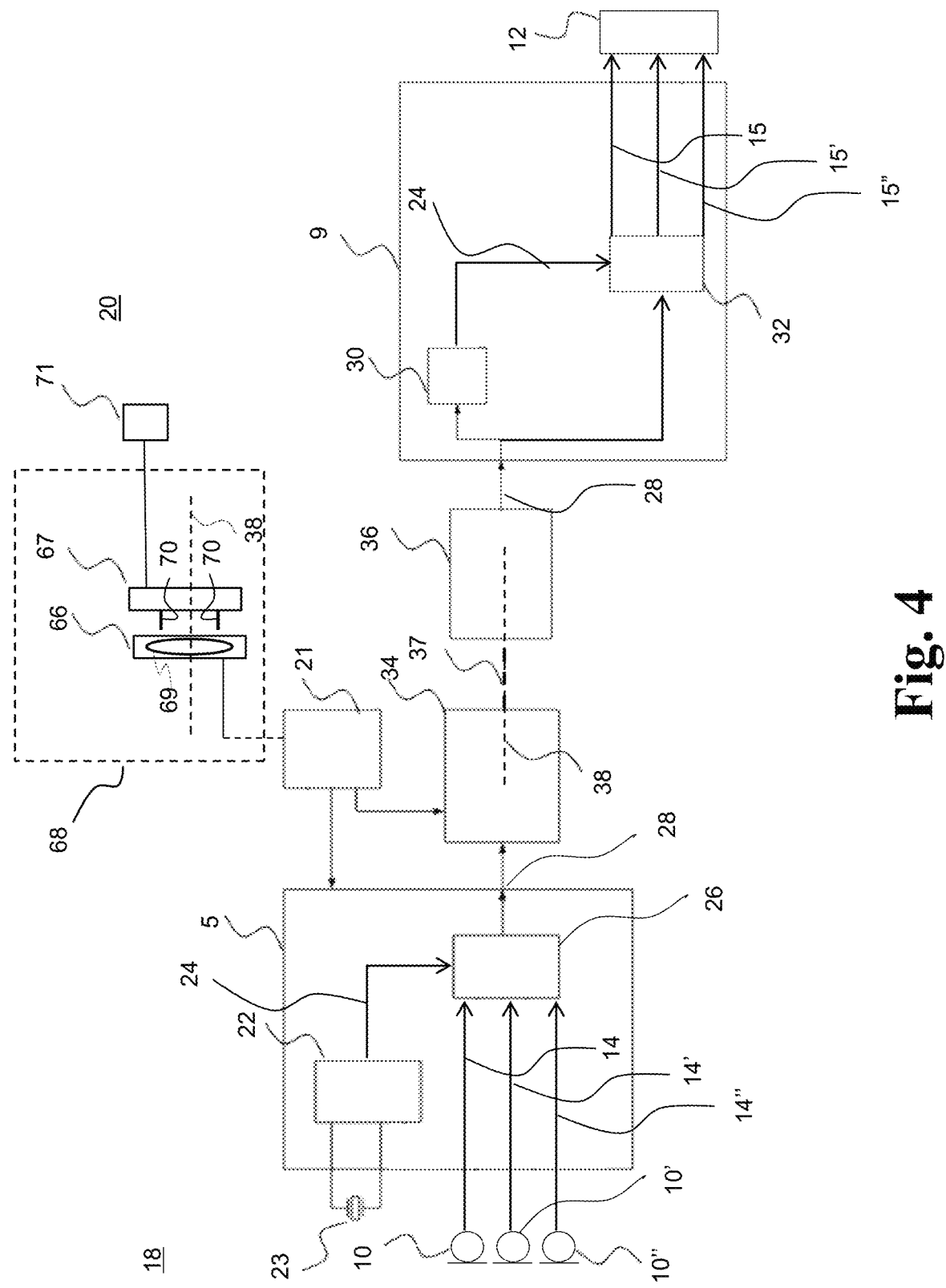
FIG. 4 schematically illustrates components in an exemplary headset.

FIG. 4 provides in exemplary form an overview of components in a headset 2 for voice communication according to the present disclosure. The headset 2 comprises three microphones 10, 10', 10". A first microphone 10 generates a first microphone signal 14, a second microphone 10' generates a second microphone signal 14' and a third microphone 10" generates a third microphone signal 14". The headset 2 may comprise less than three microphones, such as one microphone, such as two microphones. Alternatively, the headset 2 may comprise more than three microphones, such as four microphones, such as five microphones. The microphones may be provided at any microphone supporting structure such as at a microphone boom (not shown). Alternatively or additionally, the microphones may be provided in various arrangements inside the headset and/or on the surface of the head set.

The headset 2 further comprises a clock generator or a clock generating unit 22. The clock generator or clock generating unit 22 may comprise a crystal oscillator 23 which crystal oscillator may be provided separately or as a part of the clock generator. Additionally, the clock generator or clock generating unit 22 may comprise one or more latches, flip-flops, means for compensating temperature changes and/or filters. Alternatively or additionally, the clock generator 22 may be implemented as a phase locked loop.

The transmitter 18 comprises a first processor 26. The first processor 26 receives the clock signal 24 from the clock generator 22. The first processor 26 furthermore receives the microphone signals 14, 14', 14" from the microphones 10, 10', 10". The first processor 26 encodes the clock signal 24 into the microphone signals 14, 14', 14" to form the first communication signal 28. The same clock signal 24 is encoded into the first microphone signal 14, the second microphone signal 14' and the third microphone signal 14" generated by the first microphone 10, the second microphone 10' and the third microphone 10", respectively.

The clock generator 22 and the first processor 26 are provided in an Encoder Integrated Circuit 5. Alternatively, the clock generator 22 and the first processor 26 may be provided separately.

The transmitter 18 further comprises an electro-optical transmitter 34. The first processor 26 sends the first communication signal 28 to the electro-optical transmitter 34. The electro-optical transmitter 34 receives the first communication signal 28 from the first processor 26 and transforms the first communication signal from an electrical signal to an optical signal. The electro-optical transmitter may comprise any electro-optical converter, such as a light emitting diode (LED), such as an 660 nm AlGaInP LED and/or a driver integrated circuit.

The receiver 20 comprises an electro-optical receiver 36 configured to receive the first communication signal transmitted by the transmitter 18. The electro-optical receiver 36 receives the first communication signal 28 as transmitted from the electro-optical transmitter, the optical signal 37, i.e. the first communication signal in optical form, may be transmitted directly to the electro-optical receiver, or the optical signal 37 may be transmitted to the electro-optical receiver via an optical fibre, such as e.g. via a plastic optical fibre. The electro-optical receiver transforms the first communication signal from an optical signal to an electrical signal. The electro-optical receiver may comprise any opto-electrical converter, such as any photo diode, such as any photo diode being optimized to receive the first communication signal transmitted from the electro-optical transmitter. In some embodiments, the electro-optical transmitter and the electro-optical receiver are arranged co-axially about a rotational axis 38.

The receiver 20 furthermore comprises a clock re-generating unit 30. The clock re-generating unit 30 may be implemented as a phase locked loop. The first communication signal 28, as converted by the electro-optical receiver, is provided to the clock re-generating unit 30. Thus, the re-generating unit 30 receives the first communication signal 28 and regenerates the clock signal 24 from the first communication signal 28. The receiver 20 comprises a second processor 32, and the first communication signal 28 is provided to the second processor 32. The second processor 32 thus receives the first communication signal 28 from the electro-optical receiver and the re-generated clock signal 24 from the clock re-generating unit 30. The second processor 32 decodes the first communication signal 28 according to the re-generated clock signal 24. Decoding the first communication signal 28 according to the re-generated clock signal 24 provides decoded microphone signals 15, 15', 15". The second processor 32 provides the decoded microphone signals 15, 15', 15" to electric circuit 12, such as an audio integrated circuit. The electric circuit 12 may be arranged in an earphone unit (not shown).

The clock re-generating unit 30 and the second processor 32 may be provided in an integrated circuit, such as a Decoder Integrated Circuit 9.

The headset 2 furthermore comprises a power supply 21. The power supply 21 is configured to provide power to the Encoder Integrated Circuit 5 and the transmitter 18.

The power supply 21 may be fed from a battery, such as an earphone battery 71. The connection from the battery 71 to the power supply 21 may be a rotatable connection different from the optical transceiver. The electrical connection may comprise a sliding contact 68, which sliding contact 68 comprises an earphone unit side 66 and a microphone side 67, and wherein one of the earphone unit side 66 or the microphone side 67 of the sliding contact 68 comprises a first annular ring 69, in FIG. 4, it is shown on the earphone unit side, and being arranged so that the annular ring 69 is positioned around the rotational axis 38; the other of the earphone unit side 66 or the microphone side 67, shown as the microphone side, comprises a number of contact members 70 arranged in a radial distance from the rotational axis 38 so as to provide an electrical connection between the first annular ring 69 and the contact members 70.

The sliding contact 68 is illustrated schematically. It is envisaged that the rotational axis 38 of the sliding contact is the same rotational axis as for the electro-optical receiver and electro-optical transmitter, and the annular ring may be positioned coaxially around the optical connection.

Figure 5:
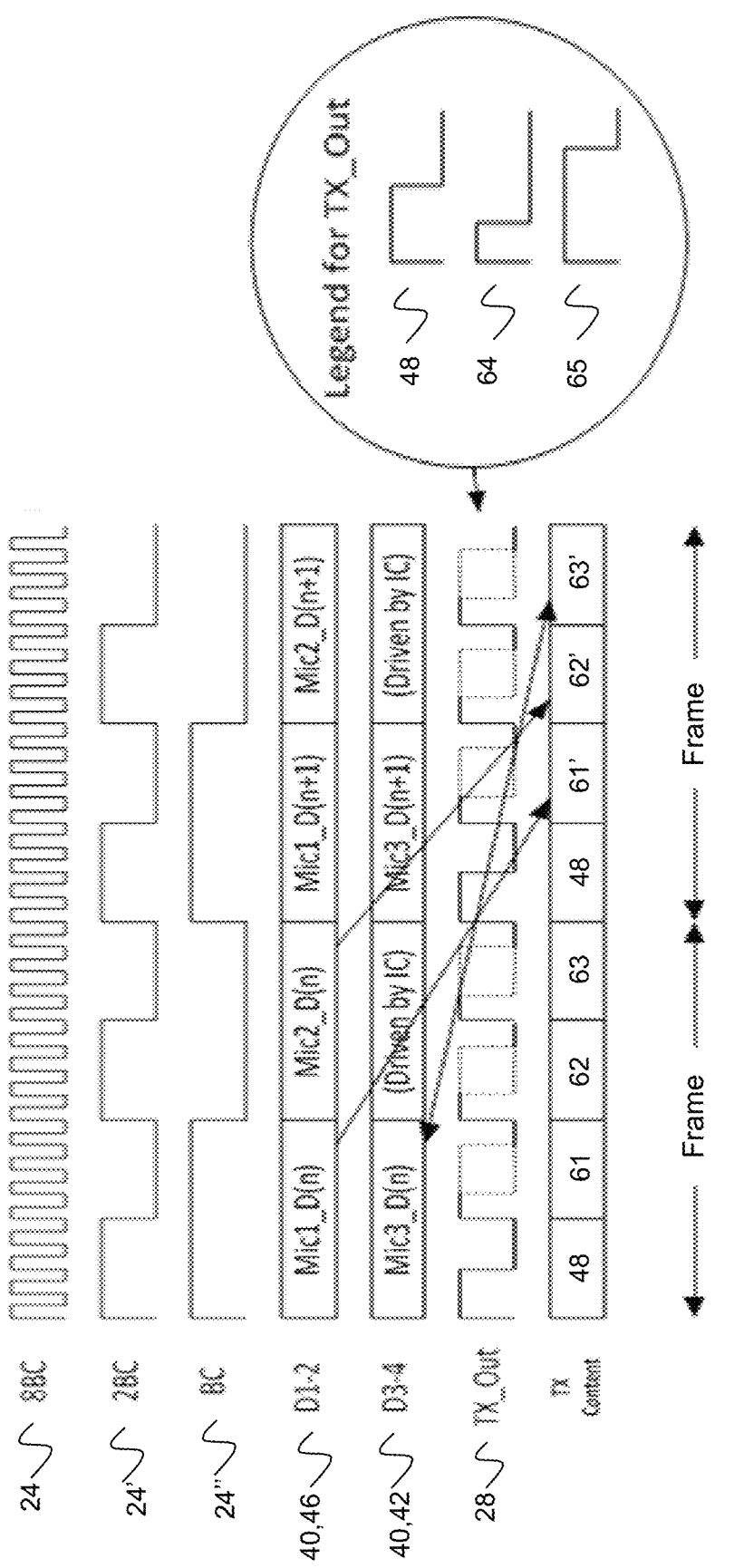
FIG. 5 schematically illustrates signals in relation to an exemplary method.

FIG. 5 schematically illustrates the encoding of the microphone signals into a serial data stream with embedded clock, i.e. into the first communication signal. The clock generator (not shown) generates a binary clock signal 24. The clock signal 24 has a base clock frequency BC, and the clock may be used at the base clock frequency or at any multiple of the base clock frequency. The binary base clock signals 24 illustrated in FIG. 5 are eight times the base frequency, 8BC, two times the base frequency, 2BC and the base frequency BC. The frequencies of the illustrated 8BC, 2BC and BC signals may for example be 24.576 MHz, 6.144 MHz and 3.072 MHz, respectively. However, it is envisaged that any clock frequency may be used mutatis mutandis.

The first processor (not shown) has two input channels 40, such as a first input channel 42 (illustrated as D3-4) and a second input channel 46 (illustrated as D1-2). The first processor may have more than two input channels 40, such as three input channels or four input channels. Each input channel 40 is configured to receive a first input signal during a first half cycle of a clock signal and a second input signal during a second half cycle of the clock signal, respectively. The first input channel 42 (D3-4) is configured to receive a first input being a dummy data signal (illustrated as "Driven by IC") and a second input being a microphone signal (illustrated as Mic3_D). The second input channel 46 (D1-2) is configured to receive a first input being a microphone signal (illustrated as Mic2_D), and a second input being a microphone signal (illustrated as Mic1_D). Each further input channel 40 may be configured to receive two microphone signals. Alternatively or additionally, each further input channel 40 may be configured to receive a first input and a second input, the first and second input being any digital signals including any one or more of: a microphone signal, a digital data signal and a contact on-off signal.

The clock signal 24, here 2BC and BC, is encoded into the first input and the second input at the first input channel 42 and at the second input channel 46 to provide a digital stream forming the first communication signal 28 (illustrated as TX_Out). The clock signal 24 is delimiting all data frames and input signals. The first input ("Driven by IC") of the first input channel 42 (D3-4) provides start of frame 48 information for each frame of the first communication signal 28.

The output data forming the first communication signal 28 (TX_Out) are distinguished by the clock duty cycle of the signal. As illustrated, "Start Of Frame" 48 is distinguished by a duty cycle of 50%, "Data=0" 64 is distinguished by a duty cycle of 25%, and "Data=1" 65 is distinguished by a duty cycle of 75%. Each frame comprises four bits. The four bit follows the same order within each frame; start of frame 48, first microphone signal 61, 61', second microphone signal 62, 62' and third microphone signal 63, 63'. The duration of the bit that contains start of frame 48 information equals that of one microphone bit. The output data forming the first communication signal 28 (TX_Out) has a state change at every bit boundary, which assists in re-generating the clock signal 24. In the second processor (not shown), i.e. on the receiver side, the clock signal 24 is re-generated from the state change of the first communication signal 28 (TX_Out), the state change being a positive edge in the present example. The clock is re-generated from the encoded signal (data stream) using the state changes of the encoded signal. The clock used for decoding may be a 4BC clock signal. The state change may be a positive edge as illustrated. Alternatively, the state change may be a negative edge.

Figure 6:
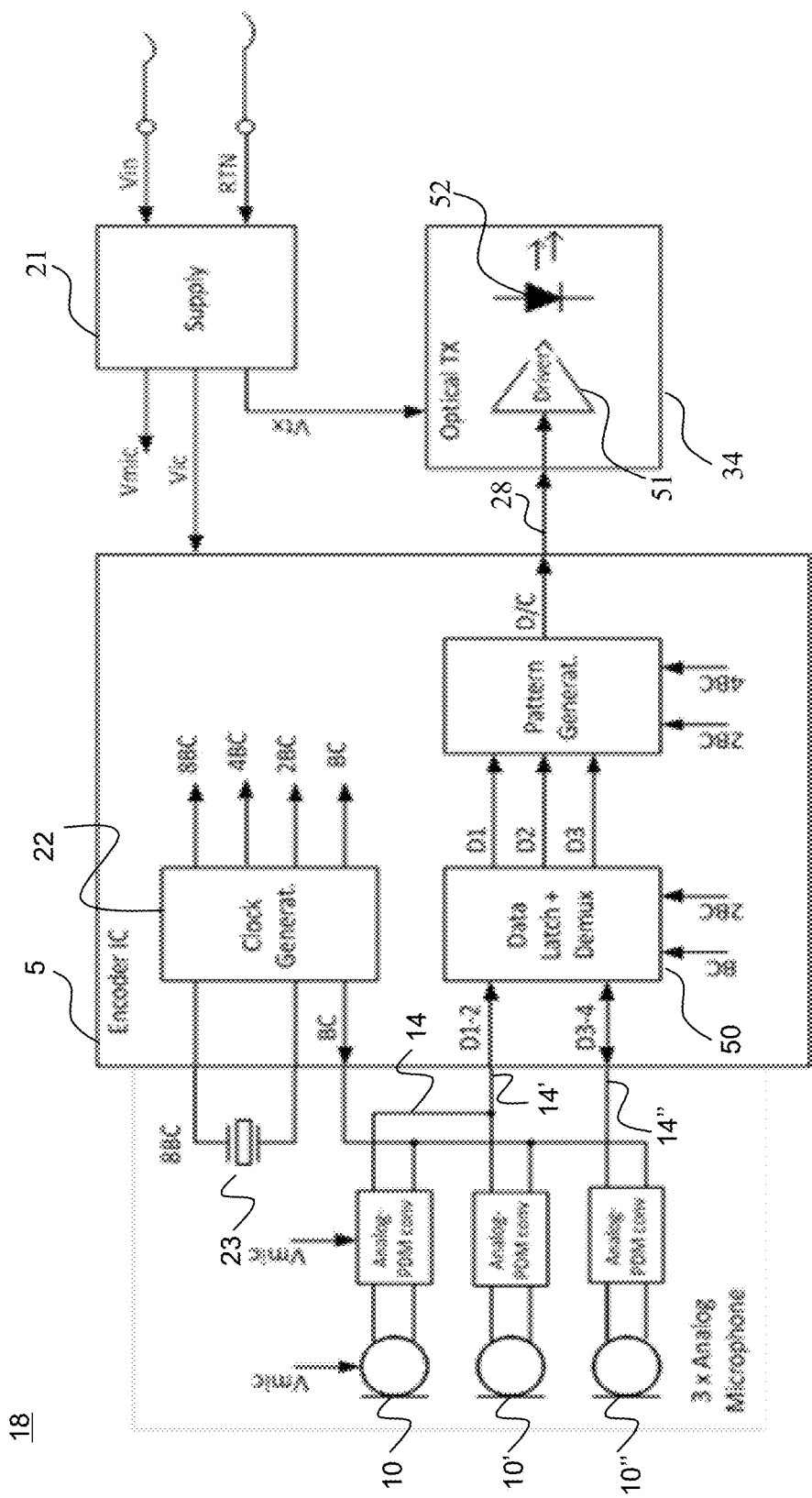
FIG. 6 schematically illustrates components in an exemplary headset.

FIG. 6 illustrates a transmitter 18 in more detail. The encoder IC 5 may be a programmable chip, having a power supply 21, electro-optical transmitter 34 and crystal oscillator 23 provided external to the chip. In the shown example, the microphones are analogue microphones 10, 10', 10" and the microphone signals are converted to digital signals, for example by using Pulse Density Modulation, PDM conversion. PDM has the advantage that only one bit is used to convey the audio. Thus, the digital microphone signals 14, 14', 14" are each provided as a single stream of bits. However, it is envisaged that any analogue to digital converter could be used to obtain a digital microphone signal.

The clock generator 22 generates the 8BC, 4BC, 2BC and BC clock signals for use with encoding of the microphone signals. The microphone signals 14, 14', 14" are aligned with the BC clock signal and provided to the encoder IC 5. The data latch and demultiplex circuits 50 and the pattern generator ensures that the clock is encoded into the microphone signals to generate the first communication signal 28, as illustrated in more detail above in FIG. 5.

The first communication signal 28 is provided to the electro-optical transmitter 34 for conversion of the first communication signal from an electrical signal to an optical signal using drivers 51 and a light emitting diode 52 as known in the art.

Figure 7:
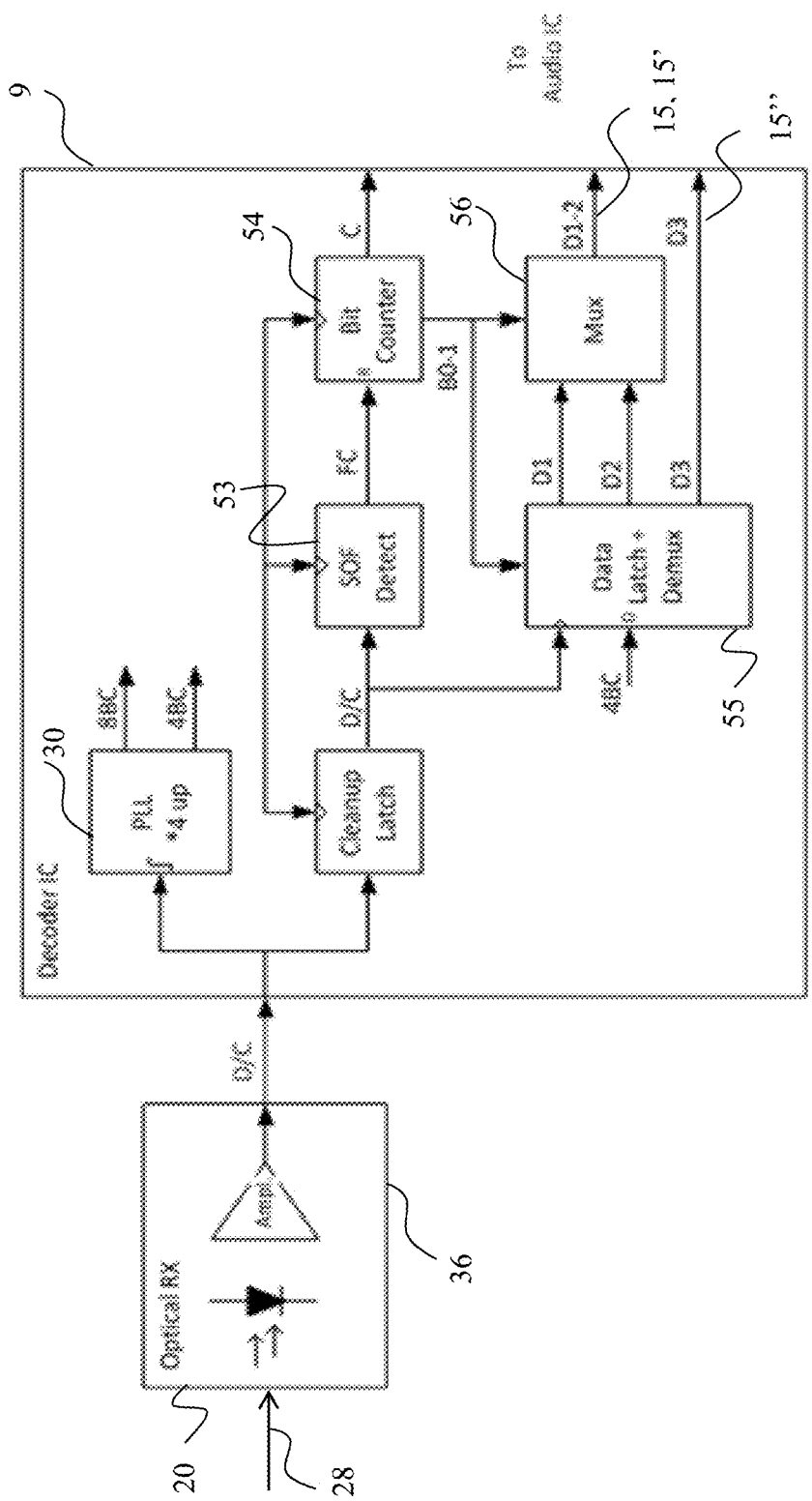
FIG. 7 schematically illustrates components in an exemplary headset.

The receiver 20 is illustrated in more detail in FIG. 7. The first communication signal 28 in optical form is received by electro-optical receiver 36 and converted or translated into an electrical signal, being an electric serial stream of data.

The decoder IC 9 comprises an on-chip clock re-generator 30, such as Phase Locked Loop, PLL, 30 which regenerates the clock from the state changes in the signal, that is in the present case as illustrated in FIG. 5, from the positive edges of the data stream. The re-generated clock is multiplied by 4 to create a 4BC clock signal.

The decoder IC furthermore comprises a second processor comprising bit counter 54 providing bit count, SOF detector 53, latch and demultiplexer 55 and multiplexer 56.

The start of frame bit sequence from the data stream is decoded by SOF detector 53, and a frame clock FC is recovered from the decoded Start of Frame bit sequence. As seen from FIG. 5, in the present example, the Start of Frame bit sequence at 4 BC is (1100).

Data from the remainder of the stream of data of the first communication signal can be latched and demultiplexed at latch and demultiplexer 55. Afterwards at multiplexer 56, the data received from latch and demultiplexer 55 are multiplexed to recreate the original multiplexed data stream from the microphones. The data in the data stream may be latched at mid-bit times and stored (no storage shown). The stored data may then be provided to multiplexer 56. The recreated multiplexed data stream corresponding to the decoded microphone signals 15, 15', 15" are provided to the audio IC or electronic circuit (not shown in FIG. 7).

Figure 8A:
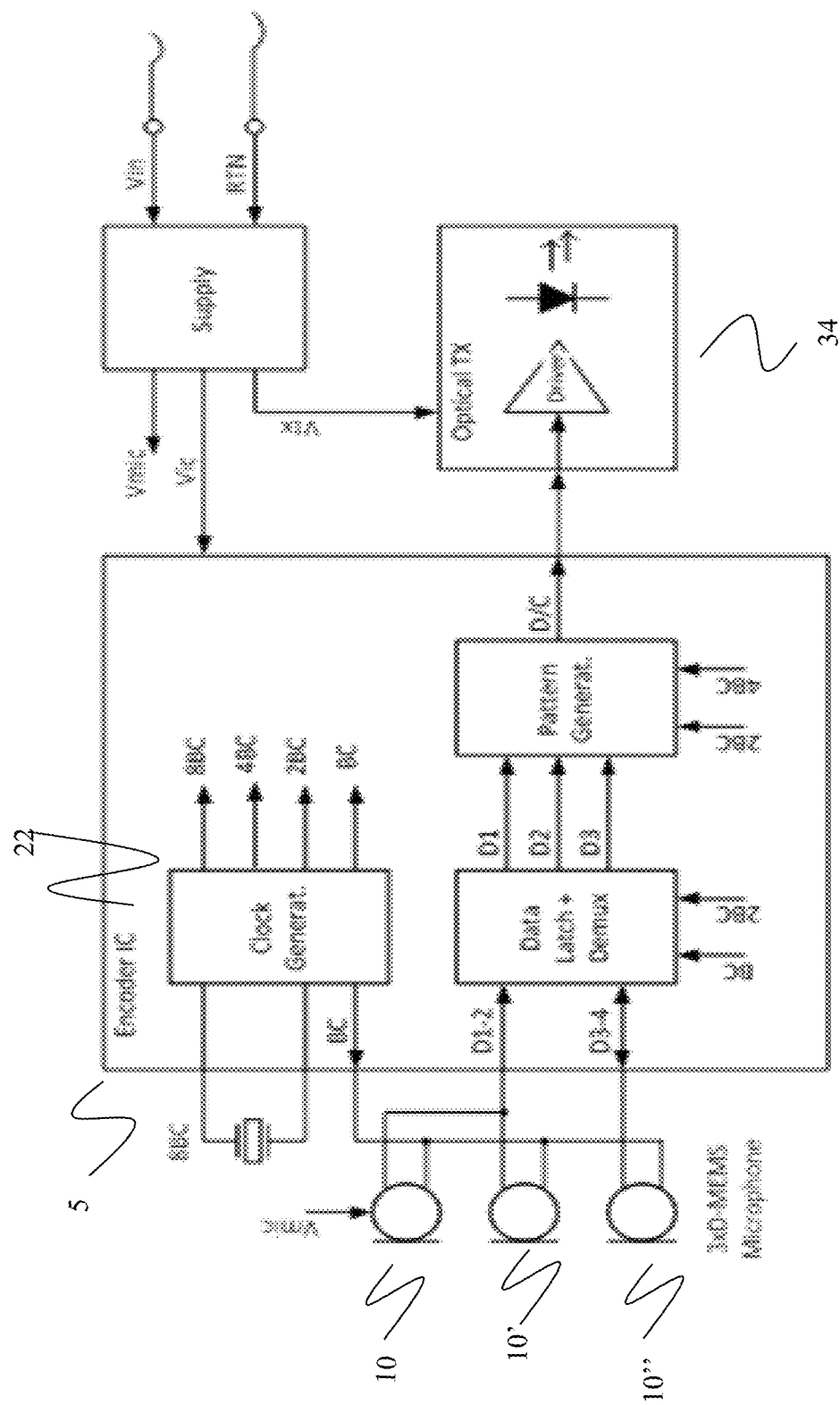
FIG. 8A and FIG. 8B schematically illustrate components in an exemplary headset, the output of FIG. 8A from Block 34 is input into Block 36 as indicated by arrow 37.
Figure 8B:
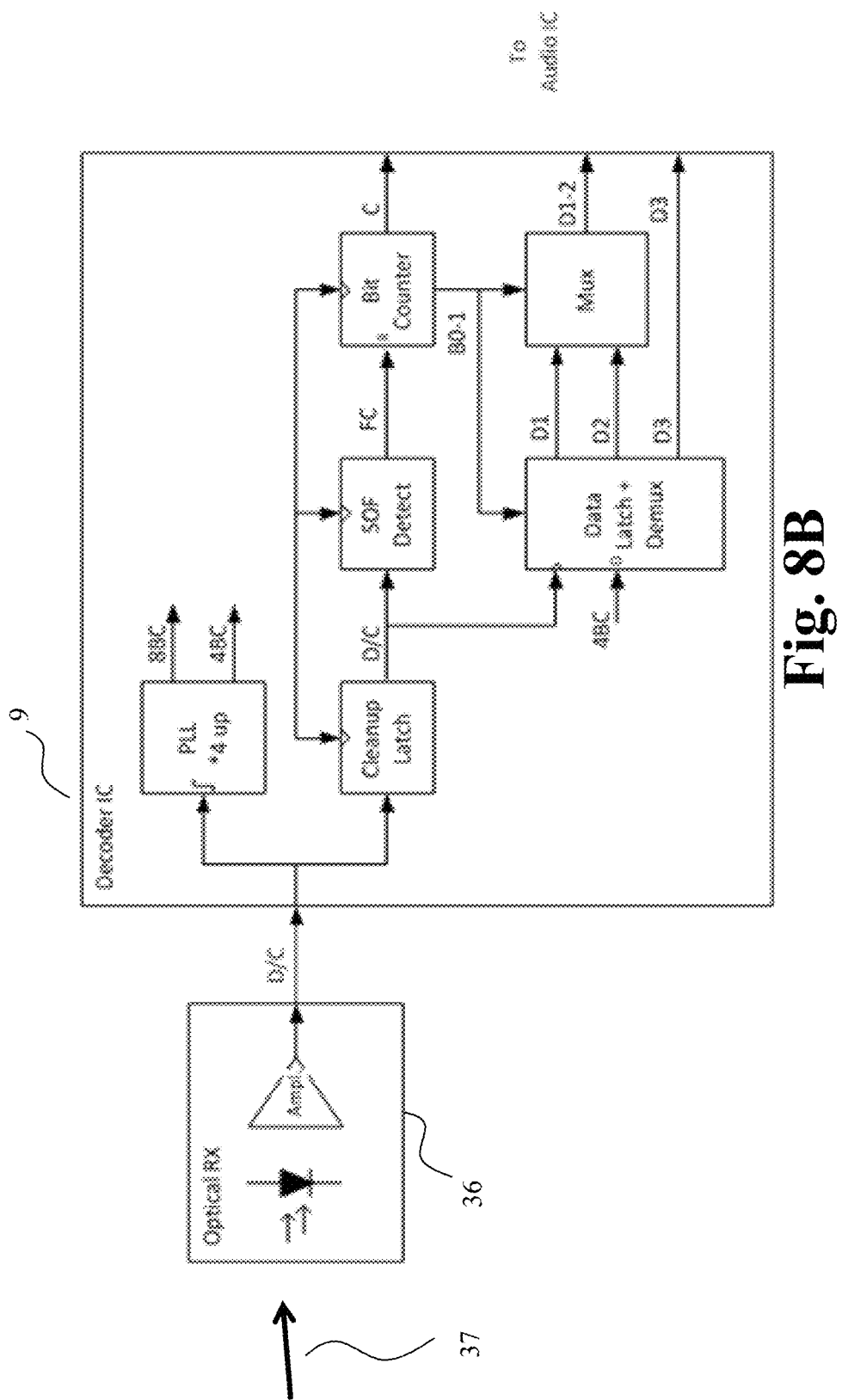

FIG. 8A and FIG. 8B together illustrate the transmitter and receiver, and the optical signal 37 is transferred from the electro-optical transmitter 34 to the electro-optical receiver 36. Preferably, the electro-optical transmitter 34 and the electro-optical receiver 36 are mounted co-axially and in proximity to allow optical signal transmission and rotation. The electro-optical transmitter 34 and the electro-optical receiver 36 may be mounted in the headset and with a distance of between 1 mm and 10 mm, such as between 1 mm and 5 mm. The signal is typically transmitted through air.

It is an advantage of the disclosure that the clock may be transmitted as part of the digital stream of data of the first communication signal. Thus, no external clock signal needs to be conveyed from the transmitter to the receiver.

Figure 9:
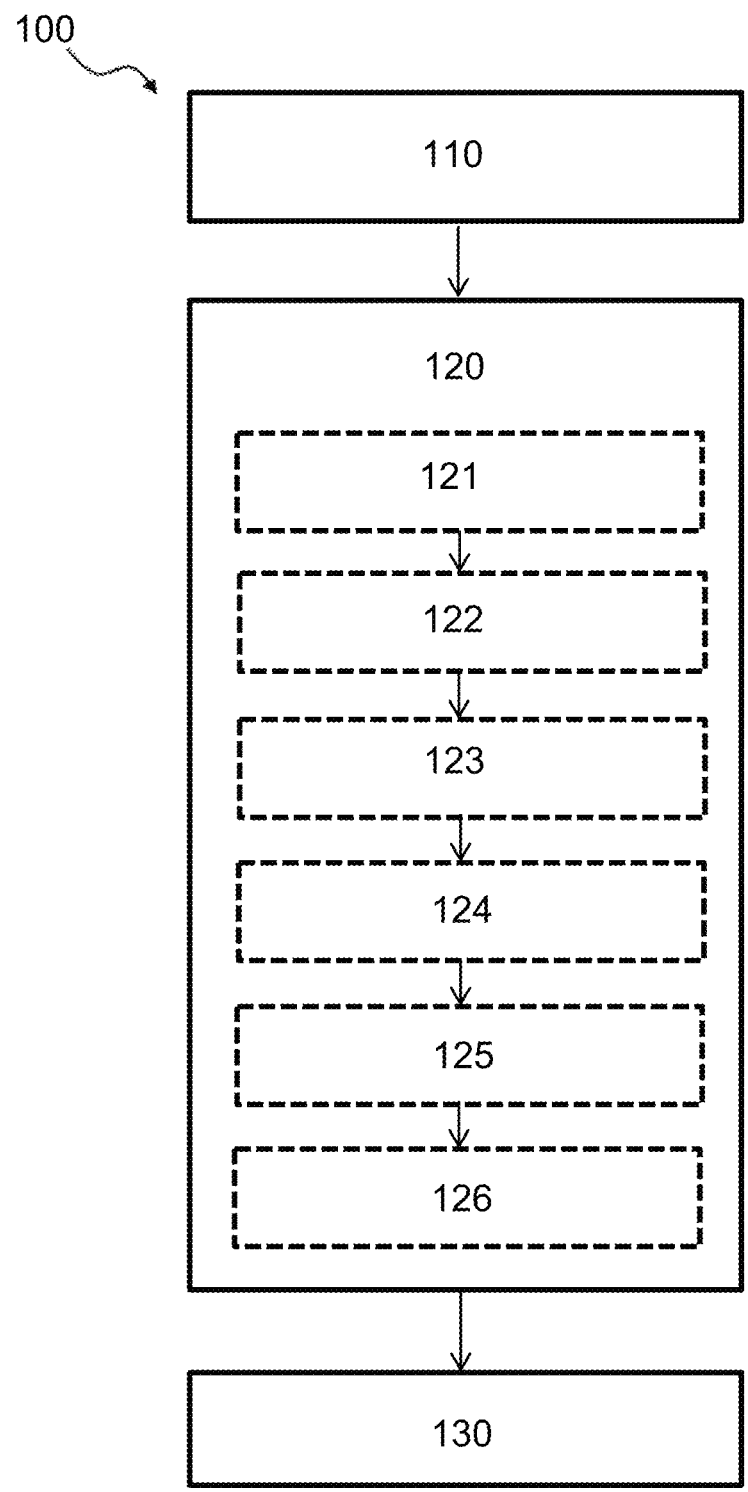
FIG. 9 shows a flow chart of an exemplary method.

FIG. 9 shows a flow chart of an exemplary method 100 of transmitting microphone signals from one or more microphones positioned at a microphone boom to an electronic circuit in an earphone unit, where the microphone boom is rotatably connected to the earphone unit in a headset for voice communication, such as the headset as described in relation to previous figures.

The method 100 comprises receiving 110 by an optical transceiving unit, one or more microphone signals generated by the one or more microphones; transmitting 120 the one or more microphone signals from the microphone boom to the earphone unit via the optical transceiving unit; and providing 130 the decoded microphone signals to the electronic circuit.

The optical transceiving unit may have a transmitter arranged in or at the microphone boom and a receiver arranged in or at the earphone unit.

Transmitting 120 the one or more microphone signals from the microphone boom to the earphone unit via the optical transceiving unit comprises providing 121 the one or more microphone signals to a transmitter of the optical transceiving unit; generating 122 a clock signal in the transmitter; encoding 123 the clock signal into the one or more microphone signals to form a first communication signal; optically transmitting 124 the first communication signal to the receiver; re-generating 125 the clock signal; and decoding 126 the first communication signal according to the re-generated clock signal to obtain decoded microphone signals.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES

2 headset
3 headband
4 earphone unit
5 encoder integrated circuit
6 speaker
7 wire
8 microphone boom
9 decoder integrated circuit
10 microphone
11 headset base station
12 electronic circuit
13 wireless transceiver
14, 14', 14" microphone signal
15, 15', 15" decoded microphone signals
16 optical transceiving unit
17. joint
18 transmitter
20 receiver
21 power supply
22 clock generator/clock generating unit
23 crystal oscillator
24 clock signal
26 first processor
28 first communication signal
30 clock re-generating unit
32 second processor
34 electro-optical transmitter
36 electro-optical receiver
37 optical signal
38 rotational axis
40 input channel
42 first input channel
44 dummy data signal
46 second input channel
48 start of frame
50 data latch and demultiplex circuit
51 drivers
52 light emitting diode
53 SOF detector
55 latch and demultiplexer
56 multiplexer
61 first microphone signal
62 second microphone signal
63 third microphone signal
64 Data=0
65 Data=1
66 earphone unit side
67 microphone side
68 first sliding contact
69 first annular ring
70 contact members
100 method
110 receiving one or more microphone signals
120 transmitting the one or more microphone signals
121 providing the one or more microphone signals to a transmitter of the optical transceiving unit;
122 generating a clock signal;
123 encoding the clock signal into the one or more microphone signals to form a first communication signal;
124 optically transmitting the first communication signal to the receiver;
125 re-generating the clock signal;
126 decoding the first communication signal
130 providing the decoded microphone signals to the electronic circuit.

The invention claimed is:

1. A headset for voice communication, the headset comprising:
   an earphone unit comprising a speaker,
   a microphone boom comprising one or more microphones, the microphone boom being rotatably interconnected with the earphone unit,
   the earphone unit comprising an electronic circuit configured to process multiple microphone signals generated by the one or more microphones, the microphone signals being transmitted from the microphone boom to the earphone unit via an optical transceiving unit, the optical transceiving unit having a transmitter and a receiver,
   wherein the headset includes multiple signal sources including microphones and where at least one of the microphones is on the microphone boom, the microphone boom comprises the transmitter and the earphone unit comprises the receiver, wherein the transmitter comprises a clock generator configured to generate a clock signal and a first processor configured to receive the microphone signals and to embed the clock signal into the microphone signals to form a first communication signal, and wherein the receiver comprises a clock re-generating unit for regenerating the clock signal, and a second processor for decoding the first communication signal according to the re-generated clock signal thereby obtaining decoded microphone signals, wherein the decoded microphone signals are provided to the electronic circuit.

2. A headset according to claim 1, wherein the transmitter comprises an electro-optical transmitter and the receiver comprises an electro-optical receiver.

3. A headset according to claim 2, wherein the electro-optical transmitter and the electro-optical receiver are arranged co-axially about a rotational axis for the microphone boom and the earphone unit.

4. A headset according to claim 1, wherein one or both of the clock generating unit and the clock re-generating unit is a phase locked loop.

5. A headset according to claim 1, wherein the clock signal is encoded into the microphone signals generated by the one or more microphones.

6. A headset according to claim 1, wherein the first processor has a number of input channels, each input channel being configured to receive a first input signal during a first half cycle of the clock signal and a second input signal during a second half cycle of the clock signal, respectively.

7. A headset according to claim 6, wherein a first input channel of the number of input channels is configured to receive a first input being a dummy data signal and a second input being a microphone signal.

8. A headset according to claim 7, wherein the first input of the first input channel provides start of frame information for each frame of the first communication signal.

9. A headset according to claim 6, wherein each further input channel is configured to receive a first input being a microphone signal, and a second input being a microphone signal.

10. A headset according to claim 6, wherein each further input channel is configured to receive a first input and a second input, the first and second input being any digital signals including any one or more of: a microphone signal, a digital data signal and a contact on-off signal.

11. A headset according to claim 6, wherein the clock signal is encoded into microphone signals and/or data signals provided through the number of input channels to provide a digital stream forming the first communication signal.

12. A headset according to claim 11, wherein the clock signal is delimiting frame and input signals in the digital stream forming the first communication signal.

13. A headset according to claim 11, wherein the digital stream forming the first communication signal has a state change at bit boundary assisting in the clock re-generation.

14. A headset according to claim 13, wherein the clock signal is re-generated from the state changes of the first communication signal.

15. A headset according to claim 1, wherein the clock signal is re-generated from the first communication signal using a state change at regular time intervals of the first communication signal.

16. A headset according to claim 1 further comprising an electrical connection comprising a first sliding contact, which comprises an earphone unit side and a microphone side, and wherein one of the earphone unit side or the microphone side of the sliding contact comprises a first annular ring arranged so that the ring is positioned around the rotational axis; the other of the earphone unit side or the microphone side comprises a number of contact members arranged in a radial distance from the rotational axis so as to provide the electrical connection between the first annular ring and the contact members.

17. A headset according to claim 16, wherein the electrical connection is a DC power connection.

18. A method of, in a headset for voice communication having a microphone boom rotatably interconnected to an earphone unit,
   transmitting microphone signals from one or more microphones positioned at the microphone boom to an electronic circuit in the earphone unit,
   the method comprising
      receiving by an optical transceiving unit, one or more microphone signals generated by the one or more microphones,
      transmitting the one or more microphone signals from the microphone boom to the earphone unit via the optical transceiving unit, the optical transceiving unit having a transmitter arranged in or at the microphone boom and a receiver arranged in or at the earphone unit, by:
      providing the one or more microphone signals to the transmitter of the optical transceiving unit,
      generating a clock signal in the transmitter,
      embedding the clock signal into the one or more microphone signals to form a first communication signal,
      optically transmitting the first communication signal to the receiver,
      re-generating the clock signal,
      decoding the first communication signal according to the re-generated clock signal to obtain decoded microphone signals, and
      providing the decoded microphone signals to the electronic circuit.

19. A headset for voice communication with digital encoding of multiple microphone voice signals, the headset comprising:
   an earphone unit comprising a speaker,
   a microphone boom comprising one or more microphones, the microphone boom being rotatably interconnected with the earphone unit,
   the earphone unit comprising an electronic circuit configured to process microphone signals generated by the microphones, the microphone signals being transmitted from the microphone boom to the earphone unit via an optical transceiving unit, the optical transceiving unit having a transmitter and a receiver, wherein the microphone boom comprises the transmitter and the earphone unit comprises the receiver, wherein the transmitter comprises a clock generator configured to generate a clock signal and a first processor configured to receive the microphone signals and to embed the clock signal into the microphone signals to form a first communication signal, and wherein the first communication signal includes voice data from the microphones, dummy data in the event that a microphone is not transmitting data, and contact on-off data, indicating whether a call is live or terminated, and wherein the receiver comprises a clock re-generating unit for regenerating the clock signal, and a second processor for decoding the first communication signal according to the re-generated clock signal thereby obtaining decoded signals, wherein the decoded signals are provided to the electronic circuit.

* * * * *

UNITED STATES PATENT AND TRADEMARK OFFICE
CERTIFICATE OF CORRECTION

PATENT NO. : 10,516,933 B2  
APPLICATION NO. : 15/991630  
DATED : December 24, 2019  
INVENTOR(S) : Leo Larsen, Rene Elbæk Jensen and Bent Dahlin Petterson Page 1 of 1

It is certified that error appears in the above-identified patent and that said Letters Patent is hereby corrected as shown below:

On the Title Page

Column 1, (73) Assignee: delete "GM Audio A/S (DK)" and insert -- GN Audio A/S (DK) --.

Signed and Sealed this  
Fourth Day of February, 2020

Andrei Iancu  
*Director of the United States Patent and Trademark Office*